United States Patent [19]

Matsumoto et al.

[11] 3,743,846

[45] July 3, 1973

[54] PLASTIC RADIATION INDICATOR OF THE COLOR CHANGE TYPE

[75] Inventors: Shoichi Matsumoto, Hodogaya-ku, Yokohama-shi; Tomomichi Tsukada, Kawasaki-shi; Kazuo Umetsu; Hiroyuki Fukaya, both of Kamakura-shi, all of Japan

[73] Assignees: Tokyo Shibaura Electric Co., Ltd., Kawasaki-shi; Toyo Chemical Co., Ltd., Kamakura-shi, Japan

[22] Filed: Feb. 8, 1971

[21] Appl. No.: 113,755

Related U.S. Application Data

[63] Continuation-in-part of Ser. No. 664,396, Aug. 30, 1967, abandoned.

[52] U.S. Cl. .................................................. 250/474
[51] Int. Cl. .............................................. G01t 1/04
[58] Field of Search ............................... 250/83 CD

[56] References Cited
UNITED STATES PATENTS

| | | | |
|---|---|---|---|
| 3,031,575 | 4/1962 | Gevantman et al. | 250/83 CD |
| 3,226,545 | 12/1965 | Potsaid | 250/83 CD |
| 3,290,499 | 12/1966 | Vale et al. | 250/83 CD |

*Primary Examiner*—Archie R. Borchelt
*Attorney*—George B. Oujevolk

[57] ABSTRACT

A plastic radiation indicator consisting of a chlorine-containing polymer and an acid-sensitive dye which changes colors in the solid state according to the variation of pH in the acid region. The chlorine-containing polymer releases hydrogen chloride due to excitation by the radiation irradiated to the polymer, the hydrogen chloride thus released changes the color of the dye present. Since the changes of color correspond to the irradited doses, the radiation indicator can be used in dosimetry.

5 Claims, 5 Drawing Figures

PLASTIC RADIATION INDICATOR OF THE COLOR CHANGE TYPE

This application is a continuation-in-part of U.S. Pat. Application Ser. No. 664,396, filed Aug. 30, 1967, and now abandoned.

The present invention relates to a plastic radiation indicator sensitive to radiation, more particularly to a plastic radiation indicator used in measuring the doses of radiation applied.

In recent years, high energy radiations such as, for example, electron rays obtained from an electron accelerator and gamma rays emitted from $^{60}$Co have been widely utilized in various fields including improvement of industrial materials, for example, polymer materials, sterilization of foods to increase their storage properties, promotion of reactions for chemical reactions and medical treatment of cancer and sarcomata. The effective and safe utilization of such high intensity radiations in large dosage for the aforementioned purposes requires the definite confirmation or determination of the doses applied.

The known practical chemical measurement of radiation doses may be broadly divided into the following two methods;

1. A method which comprises exposing radio-sensitive materials to radiation, measuring changes in their physical and chemical conditions due to exposure to radiation and converting the measured values to doses. The known radio-sensitive materials include aqueous solutions of ferrous sulfate, ceric sulfate and methylene blue respectively, benzene and certain high molecular substances. Radiations cause ferrous sulfate to be formed into ferric sulfate, ceric sulfate into cerous sulfate and benzene into phenol, and the amounts of new substances produced by radiation are measured by chemical analysis. The doses of radiation applied, for example, to methylene blue and high molecular substances are indicated by the degree of the resultant fading of colors and variations in the specific viscosity respectively.

2. A method involves the use of vitreous material which creates luminescent centers in the number corresponding to the doses of radiation to which they are exposed. The method consists in exposing said vitreous material to radiation and then to ultraviolet rays of the specific wave length and measuring the doses of the radiation thus applied from the amounts of luminescent light produced or the absorbence of ultraviolet rays. The vitreous material used in this method generally consists of metaphosphate group containing cobalt, silver or antimony oxide.

In the former method, the materials exposed to radiation as indicators are all in the liquid form and subject to various limitations in application. High skill and a long period of time is required to prepare these liquids and to determine the measured value of the doses applied. This fact means that there are difficulties that measurement of doses by such indicators cannot be performed as quickly as desired and that technical people skilled in such measurement are not always available at the time or place desired. Furthermore, it has been noted that this method involves many problems concerning accuracy of measurement and reproducibility.

According to the latter method, on the contrary, measuring doses can be performed with good sensitivity, accuracy and reproducibility. But the process of preparing radio-sensitive materials is complicated and expensive, so that where large quantities of these materials have to be used, the economic burden will be very great. Moreover, the radio-sensitive materials used as indicators are inorganic, whereas the articles which are to be actually measured for the doses of radiation applied thereto are organic, so that these inorganic media of measurement are not suitable to determine the substantial effect of radiation of these irradiated organic articles.

This invention provides a plastic radiation indicator which comprises a mixture of a chlorine-containing polymer and dye uniformly dispersed in the polymer which changes its colors in the solid state according to varying of pH in the acid region, and the mixture is molded into desired forms through gelation and melting.

The plastic radiation indicator distinctly changes its color according to the doses of radiation applied thereto. If therefore, several kinds of standard calibration charts are prepared in advance showing changes in the color of the control indicator occurring upon application of the prescribed doses, then mere visual comparison of the colors of other indicators exposed to unknown doses with those in the calibration chart will immediately define the doses applied to such other indicators. The magnitude of errors of measurement occurring in such case is almost the same as or less than that encountered in the known methods. If more accurate measurement is required concerning unknown doses applied to a given indicator, it may be carried out by first determining the light or transmittency of the indicator at the specific wave length and then comparing the measured values with those previously obtained with the control indicator.

The radiation indicator according to the present invention may take various forms, so that it is applicable over a wide range. For example, where the indicator is in the form of a large piece of film, radiation is applied to both the indicator and a sample, then it will be possible to find not only the doses of radiation applied to the sample, but also how the intensity of the radiation is distributed therein.

The present invention also provides a method for preparing radiation indicators described above. The method comprises the steps of mixing a chlorine-containing polymer with a dye which changes color in the solid state under acid conditions, subjecting the mixture to gelation and melting in such a manner that the chlorine-containing polymer is not decomposed and that all parts of said mixture go through the identical thermal hysteresis, and then molding the melted mass into the prescribed form. This process produces a radiation indicator which always displays the same degree of sensitivity to the same excitation. In the drawings:

Figure 1:
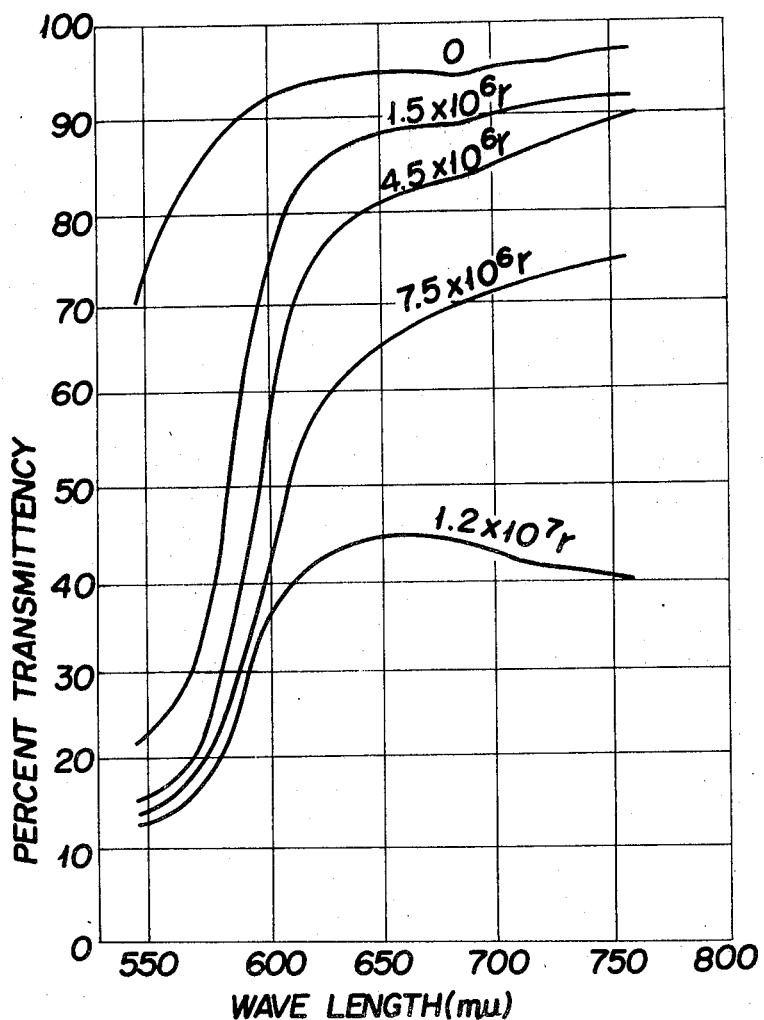
FIG. 1 is a curve diagram showing the spectra of the light transmitted through the radiation indicator of the present invention exposed to varying doses of gamma rays.

In one advantageous form of the present invention, the plastic radiation indicator consists of a polymer containing chlorine and acid sensitive dye which is dispersed uniformly at the rate of 3 per cent by weight based on the polymer and change color in the solid state according to changes of pH in the acid region. When exposed to radiation such as gamma rays and electron rays, the radiation indicator has been found to vary colors to the extent corresponding to the doses of radiation applied thereto. While the chemical reasons have not yet been fully understood to account for the fact that various colors are displayed by the radiation indicator of the present invention when exposed to radiation, the phenomenon may be accounted for by assuming that when exposed to radiation, one component of the indicator, namely, a chlorine-containing polymer is subjected to dehydrochlorination due to excitation by radiation and that the hydrogen chloride thus released reduces the pH value of another component of the indicator, i.e., the acid sensitive dye, to change its color, with the result that the color of the indicator will vary.

The chlorine-containing polymer preferably used in the present invention includes homopolymers or copolymers of chlorinated hydrocarbons such as vinyl chloride, vinylidene chloride and styryl chloride, or homopolymer or copolymer of chlorine-containing monomers, or copolymers of chlorine-containing monomers and other monomers or polymers polymerizable therewith such as copolymer of vinyl chloride-propylene, vinyl chloride-alkyl vinyl ether, vinyl chloride-vinyl acetate or vinyl chloride-vinyl acetate-maleic acid and chlorinated polymers of hydrocarbons. Some of these chlorine-containing polymers are easily available from the market. For instance, a copolymer (average degree of polymerization $\bar{P} = 600$) of 96 to 97 percent vinyl chloride and 4 to 3 percent propylene (commercially sold as VP-30, by Denki Kagaku Kogyo Co., Ltd., Japan), a copolymer ($\bar{P}$ =900) of 85 percent vinyl chloride and 15 percent vinyl acetate (commercially sold as MM-90, by Denki Kagaku Kogyo Co., Ltd., Japan), a copolymer ($\bar{P}$ =450) of 84 percent vinyl chloride, 15 percent vinyl acetate and 1 percent maleic acid (commercially known as 1,000C) and a copolymer ($\bar{P}$ =500) of 97 percent vinyl chloride and 3 percent alkyl vinyl ether containing 14 to 16 carbon atoms (commercially sold as DI-51 by Denki Kagaku Kogyo Co., Ltd., Japan) and chlorinated polyethylene (degree of chlorination 45 percent) is commercially sold under the trade name of Plaskon 300 by Allied Chemical Co., U. S. A. These chlorine-containing polymers may be used alone or in a mixture of two or more types.

Examples of an acid sensitive dye mixed with chlorine-containing polymers is p-dimethyl-amino-azobenzene, p-diethylamino-azobenzene, 4'-dimethylamino-azobenzene-2-carboxylic acid, phenyl-azo-diphenylamine, diphenyl-diazobis-1-naphthylamine-4-sodium sulfonate, thymol-sulfophthalein, 3.3', 5,5'-tetrabromo-m-cresol-sulfophthalein, mixtures of aniline blue and p-dimethylamino-azobenzene, and mixtures of p-dimethylamino-azobenzene-4-sodim sulfonate and sulfonated triphenylmethane derivatives. These dyes have a nature of definitely changing colors in the solid phase according to variations in pH. However, the present invention permits the use of other dyes, provided they have such nature.

According to the present invention, acid sensitive dye is added at the rate of 0.05 to 3 percent by weight, or preferably within the range of 0.1 to 2.0 percent by weight on the basis of the chlorine-containing polymer. If the dye is used in proportions exceeding 3 percent by weight, the radiation indicator obtained will not clearly display variations in color when exposed to radiations, thus giving rise to errors in measuring the doses of radiation applied. Amounts of dye used may be selected within the aforesaid range in accordance with the desired types and/or intensity of colors to ensure easy and accurate visual absorbation or the colorability of the chlorine-containing polymers in which the dyes are incorporated.

In practice, a radiation indicator is generally processed along with the articles to be irradiated. Therefore where it is checked using the indicator of the present invention to ascertain whether or not any of these articles have already been exposed to radiation, it will only be required to observe visually whether or not the indicator which was placed with the articles retains the same color as when it was not irradiated. That is, the presentation of the original color by the indicator means that the article was not expsed to radiation. Conversely, when the indicator displays a different color from the original one, then it shows that said article has already been irradiated. However, where it is further desired to find exactly what the applied doses were, it will be necessary to use at least the following procedure.

Figure 2:
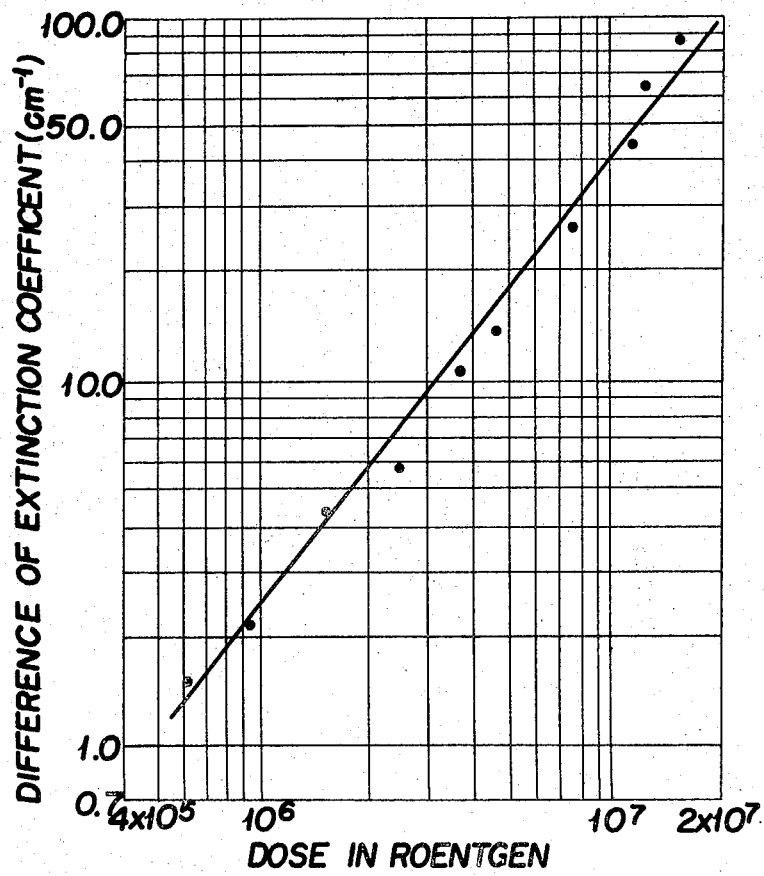
FIG. 2 is a graph indicating on a log-log scale the relations of the doses applied and the coefficient of light absorbence per unit thickness in the radiation indicator of the invention.

The simplest method for measuring doses is to prepare in advance using the same type of indicator a plurality of standard calibration charts, each representing the color presented by the indicator when exposed to several known doses of radiation, and then to visually determine by comparison which of the colors indicated on these charts agree with that displayed by another indicator subjected to unknown doses of radiation. In this case, the range of measurable doses, of course, varies with the number of charts prepared. In general, it is possible to measure doses ranging from $10^4$ to $10^7 r$ with a precision of ±10 percent maximum.

Where more minute determination of doses is further demanded, the method used will comprise measurement by spectrophotometer of the absorbence or reflexibility of light in a radiation indicator. In such manner of dosage measurements, varying known doses of radiation are applied to the indicators of the same type according to the present invention and the spectra of light transmitted through or reflected from each of them is determined. FIG. 1 is a curve diagram showing the relations of the wave length and the transmittency of light in an indicator consisting of 50 parts by weight of 87 percent vinyl chloride-13 percent vinyl acetate copolymer (average degree of polymerization being 450) and 0.15 part by weight of p-dimethylamino-azobenzene after the indicator is exposed to varying doses of gamma rays. These curves indicate that there are certain functional relations between the light transmittency at a given wave length, for example, 680 millimicrons and the dosage. And these relations are linear on a log-log scale as shown in FIG. 2. If, therefore, said relations have been defined in advance relative to a given indicator, then the doses of radiation applied to another indicator having the same properties as the first mentioned indicator can be measured with high precision merely by determining the differential light transmittencies of the latter between exposure and non-exposure to radiation.

Figure 3:
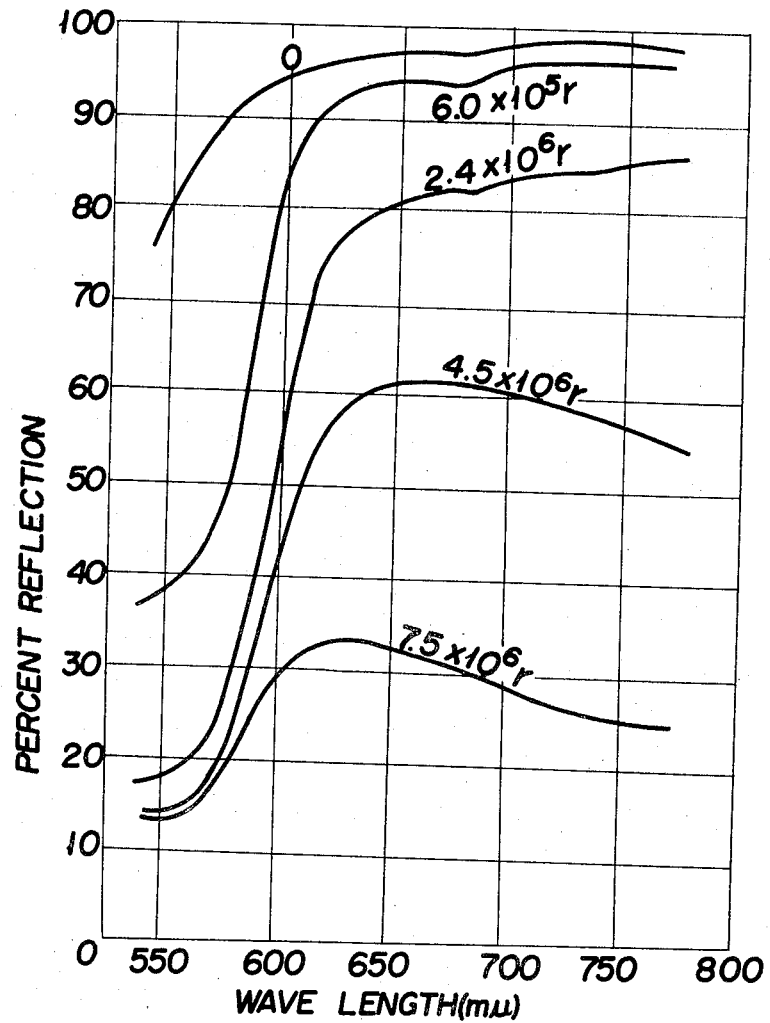
FIG. 3 is a curve diagram showing the spectra of the light reflected by the radiation indicator of the present invention upon exposure to varying doses of gamma rays.
Figure 4:
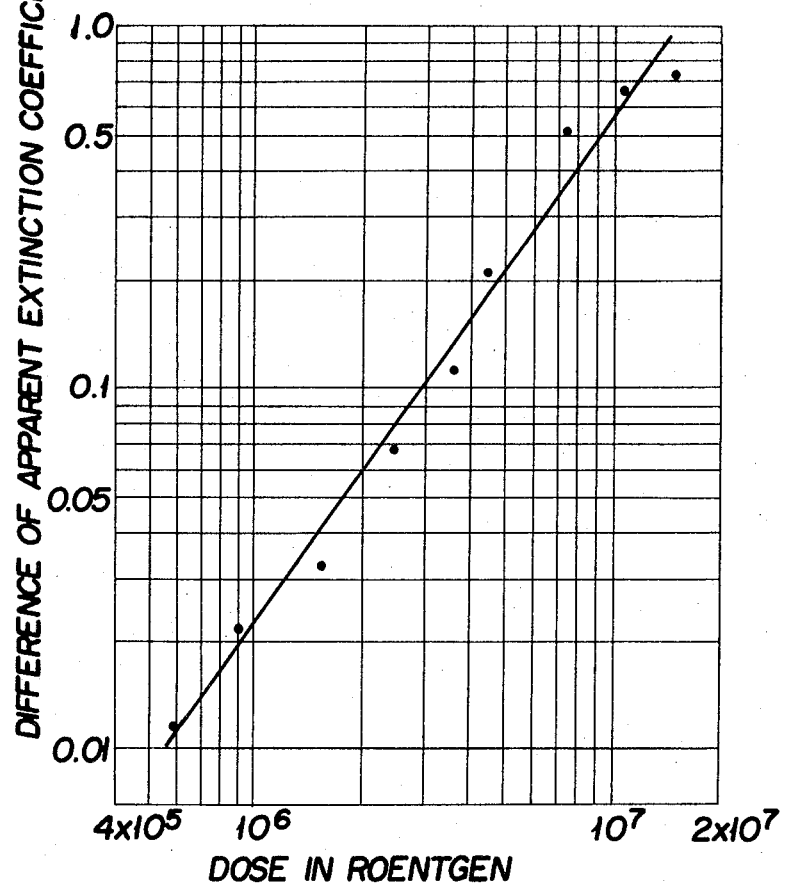
FIG. 4 is a graph indicating on a log-log scale the relation of the doses applied and the coefficient of light in the radiation indicator of the invention.

Where, however, an indicator presents a relatively small light transmittency, it is more advisable to rely on its light reflexibility in determining the doses of radiation applied thereto. FIG. 3 shows the relations of the wave length and the per cent reflection of light in the indicator of the present invention which has been exposed to varying doses of radiation. FIG. 4 indicates on a log-log scale the relations of the differential light reflexibilities of the indicator at a wave length of 680 millimicrons between exposure to radiation and the doses applied. In this case, the relations of the differential light reflexibilities and the doses are linear as in the case of transmittency.

The radiation indicator of the present invention has a specific range of measurable doses which originates with the properties of its components, that is, chlorine-containing polymers and acid sensitive dyes. This means that the doses of radiation which will cause the indicator as a whole to change color is determined only within the range defined by the degree of dehydrochlorination reaction occurring in th chlorine-containing polymer used due to exposure to radiation and the range of pH wherein the dye component can definitely vary colors. However, the aforementioned range of doses measurable by the indicator of the present invention may be given an appreciably wide allowance by incorporating special additions therein.

In the radiation indicator according to the present invention, the range of doses measurable can be transferred toward the high dosage side by adding materials inhibitory to the dehydrochlorination reaction caused by exposure of the chlorine-containing polymer to radiation or other substances which will trap part of the hydrogen chloride or chlorine released by the reaction in such a manner that the dye contained in the indicator may not be affected by the materials thus trapped. The materials that will restrict the indicator in changing colors include metal salts of inorganic or organic acids such as lead stearate, lead sulfate, dibutyl-tin-dimaleate, dibutyl-tin-dilaurate, and dibutyl-tin-dinonyrate. Preferably, the inhibitory material is metallic soaps containing zinc, cadmium, tin or lead due to good dispersability in chlorine-containing polymer. Inhibitors of the radiosensitivity of a radiation indicator reduce the sensitivity according to the types and proportions added. In other words, the indicator containing these additives will require application of larger doses of radiation than without the addition before the first mentioned indicator can display the same type and/or intensity of color as that exhibited by the latter due to exposure to radiation. This means that the range of doses ascertainable or measurable by the indicator is transferred to a region of larger dosage. The extent of transferring the range of measurable doses will, of course, depend on the properties and proportions of additives contained in the indicator.

Conversely, for transferring the range of doses measurable by the indicator to the lower dosage side, promoters are added to the indicator to promote the dehydrochlorination reaction of chlorine-containing polymer caused by application of radiation. The additives used for this purpose include primary or secondary alkylamine group such as isoamylamine and diisoamylamine, phenylamines such as pyridine, aniline, diphenylamine and morpholine, quarternary ammonium salts such as tetraethylammonium iodide, alkali salts of phenol, chlorides and oxides of metals, hydroxides of alkaline earth metals and mixtures comprising any one or more of the above listed. Unlike the aforementioned inhibitors of the dehydrochlorination reaction of chlorine-containing polymers, the above mentioned promoters help to transfer the range of doses measurable by the indicator to the lower dosage side according to the types and proportions added.

A mixture which consists of a chlorine-containing polymer, an acid sensitive dye and, if required, an agent added to promote or inhibit the dehydrochlorination reaction of the chlorine-containing polymer caused by application of radiation, may be fabricated into desired forms by the molding of ordinary thermoplastic resins using compression, calendering, extrusion and injection techniques. While the form of the radiation indicator of the invention may be freely selected according to the desired application, it will generally be in the form of film, sheet, plate or fiber.

The present invention also provides a method for manufacturing the aforementioned radiation indicators which will have uniform radiosensitivity. As has been described, the chlorine-containing polymer involved in the radiation indicator of the invention gives rise to a dehydrochlorination reaction when the indicator is exposed to radiation. However, we have found that this reaction also arises by the application of heat. Although the reaction is deemed to take place even at relatively low temperatures, for example, approximately 50°C which are not considered to produce any substantial physical changes in the indicator, the greatest possibility for occurrence of the reaction lies in the melting of the indicator prior its molding. For instance, when the raw materials of the indicator are molded into film by calendering, they are mixed at temperatures at which the chlorine-containing polymer is melted. The raw materials thus mixed are fabricated into film by turns according to the size of the batches charged into a calender. At the time of molding, portions of the raw materials other than those introduced into the calender continue to be heated and mixed on the preceding milling rolls. Consequently the indicators molded first and last on the calender differ widely in the time and temperature, that is, thermal hysteresis, used in processing, thus eventually resulting in their different radiosentivities due to varying degrees of dehydrochlorination to which the chlorine-containing polymer has previously been subjected. The indicators going through such varying forms of hysteresis, though comprised of exactly identical components, will not have equal radiosensitivity, i.e., the degree in which they change color. Therefore, when these indicators are used in measurement of doses of radiation, they will give erroneous values in all probability.

According to the process of the present invention, however, the indicator of the same type are molded through the same hysteresis. To take the example of calendering, the raw materials of the indicator are first mixed with heat on the preceding milling rolls only in the amount not exceeding the maximum batch size allowable or the following calender used, and the mixture is molded at once by said calender. Calendering cycles are repeated under the same conditions of time and temperature one after another. This is also the case with other molding methods such as extrusion, compression and injection whereby indicators are molded. Thus, the indicators of the same composition prepared through the same hysteresis according to the aforementioned process will always have uniform radiosensitivity.

The radiation indicator of the present invention also permits inclusion of various additives such as those used in the molding of ordinary synthetic resin so as to provide desirable properties for them or improve their moldability. Where the indicator should be flexible to a certain extend, the raw materials of the indicator may be incorporated with ordinary plasticizers such as dioctyl phthalate, dibutyl phthalate and epoxidized soybean oil. Again, where it is intended to produce an opaque indicator, the raw materials may contain opaque fillers such as alumina, thoria and titanium oxide. Also the moldability of the raw materials of the indicator will be improved by adding small portions of lubricant such as liquid paraffin. These and other additives will have no harmful effect on the indicator of the present invention, and their selection will be known to those skilled in the art.

The present invention will be understood more clearly from the following specific examples wherein all parts are by weight.

Example 1

| | |
|---|---|
| Vinyl chloride-vinyl acetate copolymer (vinyl chloride content: 90% average degree of polymerization: 900) | 100 parts |
| Dibutyl-tin-dilaurate | 1 |
| Maleate type stabilizer → Dibutyl tinmaleate (stabilizer) (sold under the trade name "TUS No. N-2000 E" by Nitto Kasei Co., Japan) | 0.3 |
| Liquid paraffin | 1.5 |
| p-dimethylamino-azobenzene | 0.2 |

Figure 5:
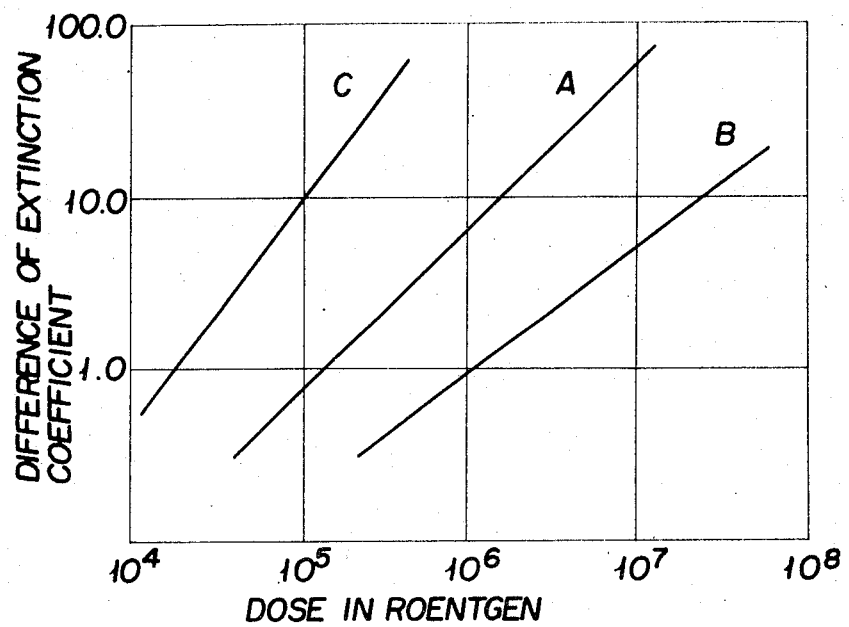
FIG. 5 is a graph showing the relations of applied doses and variations in radiation absorbence on a log-log scale.

The above listed components were milled together for 3 minutes by passing several times between a pair of rolls heated to 150° C. The mixture thus milled was fed to a calender consisting of three heated rolls, namely, the first roll heated to 150° C, the second contacting the first to 155° C and the third contacting the second to 150° C, and molded into film 0.2mm thick. The radiation indicator thus prepared in the the form of film had a bright yellow color, and when irradiated, changed colors progressively through an orange color at $1 \times 10^5 r$ to a red color at $2 \times 10^6 r$, the relations of the doses applied and the variations in absorbence at a wave length of 550 millimicrons in the indicator are presented in a straight line A, FIG. 5 on a log-log scale. As clearly seen from this figure, the indicator enables doses from $10^5 r$ to $10^7 r$ to be easily measured or confirmed either by visual comparison of the colors produced with those in the standard calibration charts or by conversion from the rate of increase in absorbence.

Example 2

In the composition of Example 1, dibutyl-tin-dilaurate was increased to three parts and "TUS No. N-2,000 E" to one part. The mixture was molded into film 0.2mm thick under the same conditions as in Example 1. The relations of the doses applied and the variations in absorbence at a wave length of 550mm in this indicator are shown by a straight line B in FIG. 5. This line B is positioned nearer to the higher dosage side than the line A of Example 1. The indicator thus prepared changed colors to orange at $8 \times 10^5 r$ and red at $1 \times 10^7 r$.

Example 3

Added to the composition of Example 1 were 0.2 part of monisoamylamine and 0.1 part of diisoamylamine. The mixture was molded into film 0.2mm thick, under the same conditions as in Example 1. The relations of the doses applied and the variations in absorbence at a wave length of 550 millimicrons in the indicator are illustrated by a straight line C in FIG. 5. As shown in this figure, the line C is appreciably nearer to the lower dosage region than the lines of the indicators of Examples 1 and 2. The indicator prepared in this example displayed an orange color at $4 \times 10^4 r$ and a red color at $2 \times 10^5 r$, the colors varying progressively according as the doses changed.

Example 4

| | |
|---|---|
| Vinyl chloride-propylene copolymer (Sold under the trademark "VP-30" by Denki Kagaku Kogyo Co., Ltd., Japan) | 100 parts |
| Mixture of Zinc stearate and Cadminum stearate | 3 |
| Epoxidized soybean oil | 1 |
| Butyl stearate | 0.8 |
| Aniline blue | 0.05 |
| p-dimethylamino-azobenzene | 0.05 |

Three kilograms of the mixture having the above composition were milled for 2 minutes by passing repeatedly between two rolls, each 11 inches in diameter and 25 inches long and heated to 150° C to 155° C on the surface. The milled mass was fed to a calender comprising four rolls, each 8 inches in diameter and 20 inches long and heated to 150° C to 160° C on the surface and molded into film 0.15mm thick and 45cm wide. The radiation indicator thus prepared had a bluish green color before irradiation and upon exposure to radiation, the color changed to yellow at $5 \times 10^4 r$ and to red at $6 \times 10^5 r$.

Example 5

| | |
|---|---|
| A copolymer ($\bar{P} = 900$) of 85% vinyl chloride-15% vinyl acetate copolymer (Sold under the trade name "MM-90" by Denki Kagaku Kogyo Co., Ltd., Japan) | 90 parts |
| Vinyl chloride-vinyl acetate-maleic acid copolymer (1000 C) | 10 |
| Polymerized organic tin mercapto compound (Sold under the trade name "Advastab T-17MJ" by Toa Rika Kogyo Co., Japan) | 3 |
| Polymerized dibutyl tin dilaurate → poly skanane diol tin dilaurate (Sold under the trade name "Advastab T-12J" by Toa Rika Kogyo Co., Japan) | 2 |
| Liquid paraffin | 1 |
| Aniline blue | 0.05 |
| p-dimethylamino-azobenzene | 0.05 |

Three kilograms of the mixture comprising the above listed raw materials were fed to two milling roll apparatuses of the same type as that used in Example 4 alternately at intervals of 2 minutes and milled for 3 minutes. The raw mixture thus milled was then fed to a calender of the same type as that used in Example 1 alternately from the two milling roll apparatuses, and continuously molded into film 0.15mm thick and 45cm wide. The bluish green radiation indicator thus prepared, when exposed to radiation, progressively changed colors through yellow at $1 \times 10^4 r$ to red at $2 \times 10^5 r$.

Example 6

| | |
|---|---|
| Vinyl chloride-alkyl vinyl ether copolymer (Sold under the trade name "DI-51" by Denki Kagaku Kogyo Co., Ltd. Japan) | 100 parts |
| Dibutyl-tin-polysulfide (Sold under the trade name "TVS No. 1000" by Nitto Kasei Co., Japan) | 2 |
| Dibutyl-tin-distearate | 1 |
| Liquid paraffin | 0.05 |
| p-dimethylamino-azobenzene | 0.05 |

The mixture of the composition in Example 6 was molded under the same conditions as in Example 5 into film 0.2mm thick and 45cm wide. The bluish green radiation indicator obtained, when irradiated by $^{60}Co$, changed to a yellow color at $2 \times 10^5 r$ and a red color at $9 \times 10^5 r$, with varying colors displayed by different doses.

Example 7

| | |
|---|---|
| Chlorinated polyethylene (Sold under the trade name "Plaskon 300" by Allied Chemical Co., U. S. A.) | 100 parts |
| Polystannous diol ether ester (Sold under the trade name "Advastab T-18J" by Toa Rika Kogyo Co., Japan) | 2 |
| Dibutyl-tin-dilaurate | 2 |
| Liquid paraffin | 0.5 |
| Aniline blue | 0.05 |
| p-dimethylamino-azobenzene | 0.05 |

The mixture of the above composition was milled for 4 minutes by a milling roll apparatus of the same type as in Example 4 which was heated to 160° C to 170° C on the surface. The milled mass was molded under the same conditions as in Example 1 into film 0.15mm thick and 45cm wide. The bluish green radiation indicator thus prepared, upon exposure to gamma rays from $^{60}Co$, progressively changed colors through yellow at $5 \times 10^6 r$ to red at $2 \times 10^7 r$.

While the invention has been described in connection with some preferred embodiments thereof, the invention is not limited thereto and includes any modifications and alternations which fall within the true spirit and scope of the invention as defined in the appended claims.

What is claimed is:

1. In a molded plastic radiation indicator treated with a uniform thermal hysteresis comprising a mixture which essentially consists of a polymer containing chlorine and an acid sensitive dye uniformly dispersed in the polymer at the rate of less than 3 percent by weight based on the polymer, said dye giving a color change according to variations in pH in the acid region, the improvement therein wherein the mixture also contains one of two types of additives so as to transfer the measuring range of the radiation indicator, said first additive being at least one of metal salts of the group consisting of stearate, meleate, laurate, sulfate, and carbonate salts, said metal being selected from the group consisting of lithium, sodium, magnesium, calcium, strontium, barium, zinc, cadmium, tim, and lead, in order to transfer a range of dosage measurable by the radiation indicator to a higher dosage region, said second additive being selected from the group consisting of alkylamines, phenylamines, diphenylamine, morpholine, quarternary ammonium salts, alkali salts of phenol, metal chlorides, metal oxides, and hydroxides of alkaline earth metals, in order to transfer a range of dosage measurable by the radiation indicator to a lower dosage region.

2. A molded plastic radiation indicator according to claim 1, wherein the chlorine-containing polymer is a hydrocarbon polymer, chlorinated after polymerization of the monomeric hydrocarbon.

3. A molded plastic radiation indicator according to claim 1, wherein said acid sensitive dye is a compound selected from the group consisting of p-dimethylamino-azobenzene, p-diethylamino-azobenzene, 4'-dimethylamino- azobenzene-2-carboxylic acid, phenyl-azo-diphenylamine, diphenyl-diazo-bizo-bis-1-naphthylamine-4-sodium sulfonate, thymol-sulfophthalein, 3.3', 5.5'-tetrabromo-m-cresol-sulfophthalein, mixtures of aniline blue and p-dimethylamino-azobenzene, mixtures of p-dimethylamino-azobenzene-4-sodium sulfonate and sulfonated triphenyl methane derivatives.

4. In a molded plastic radiation indicator treated with a uniform thermal hysteresis comprising a mixture which essentially consists of a polymer containing chlorine and an acid sensitive dye uniformly dispersed in the polymer at the rate of less than 3 percent by weight based on the polymer, said dye giving a color change according to variations in pH in the acid region, the improvement therein wherein the mixture additionally contains at least one of metal salts of the group consisting of stearate, maleate, laurate, sulfate, and carbonate salts, said metal being selected from the group consisting of lithium, sodium, magnesium, calcium, strontium, barium, zinc, cadmium, tim, and lead, in order to transfer a range of dosage measurable by the radiation indicator to a higher dosage region.

5. In a molded plastic radiation indicator treated with a uniform thermal hysteresis comprising a mixture which essentially consists of a polymer containing chlorine and an acid sensitive dye uniformly dispersed in the polymer at the rate of less than 3 percent by weight based on the polymer, said dye giving a color change according to variations in pH in the acid region, the improvement therein wherein the mixture additionally contains additives selected from the group consisting of alkylamines, phenylamines, diphenylamine, morpholine, quarternary ammonium slats, alkali salts of phenol, metal chlorides, metal oxides, and hydroxides of alkaline earth metals, in order to transfer a range of dosage measurable by the radiation indicator to a lower dosage region.

* * * * *